US012112209B2

(12) United States Patent
Parthasarathy et al.

(10) Patent No.: US 12,112,209 B2
(45) Date of Patent: Oct. 8, 2024

(54) APPLICATION ANOMALY DETECTION USING TRAINED INFRASTRUCTURE MACHINE LEARNING MODELS

(71) Applicant: MONTYCLOUD INC, Redmond, WA (US)

(72) Inventors: Kannan Parthasarathy, Redmond, WA (US); Venkatanathan Krishnamachari, Woodinville, WA (US)

(73) Assignee: MONTYCLOUD INC, Redmond, WA (US)

( * ) Notice: Subject to any disclaimer, the term of this patent is extended or adjusted under 35 U.S.C. 154(b) by 482 days.

(21) Appl. No.: 17/525,863

(22) Filed: Nov. 13, 2021

(65) Prior Publication Data

US 2022/0156121 A1    May 19, 2022

Related U.S. Application Data

(60) Provisional application No. 63/113,206, filed on Nov. 13, 2020.

(51) Int. Cl.
*G06F 9/50* (2006.01)
*G06F 11/30* (2006.01)
*G06F 11/34* (2006.01)

(52) U.S. Cl.
CPC .......... *G06F 9/5055* (2013.01); *G06F 9/505* (2013.01); *G06F 11/3051* (2013.01); *G06F 11/3438* (2013.01)

(58) Field of Classification Search
CPC .... G06F 9/5055; G06F 9/505; G06F 11/3051; G06F 11/3438
See application file for complete search history.

(56) References Cited

U.S. PATENT DOCUMENTS

| | | | |
|---|---|---|---|
| 9,712,490 B1* | 7/2017 | Burns | H04L 63/168 |
| 10,230,568 B2 | 3/2019 | Maes | |
| 10,546,121 B2 | 1/2020 | Brech et al. | |
| 2008/0271038 A1* | 10/2008 | Rolia | G06F 9/505 |
| | | | 718/105 |
| 2017/0126718 A1* | 5/2017 | Baradaran | H04L 63/0281 |
| 2017/0228227 A1 | 8/2017 | Winterfeldt et al. | |

(Continued)

*Primary Examiner* — Benjamin C Wu
(74) *Attorney, Agent, or Firm* — Jason C. Cameron (57) ABSTRACT

A system and method for facilitating management of application infrastructure for plurality of users is disclosed. The method includes identifying a set of infrastructure components corresponding to an application and determining configuration information associated with the application based on the set of infrastructure components. The method further includes identifying a plurality of patterns of the application based on the configuration information of the set of infrastructure components and generating one or more application fingerprints corresponding to the application based on the plurality of patterns. Further, the method includes determining one or more anomalies in the application based on the one or more application fingerprints and generating one or more recommendations for resolving the one or more anomalies based on the one or more application fingerprints and prestored information. Furthermore, the method includes outputting the one or more anomalies and the one or more recommendations to one or more user devices.

18 Claims, 4 Drawing Sheets

(56) References Cited

U.S. PATENT DOCUMENTS

| | | | |
|---|---|---|---|
| 2019/0171966 A1* | 6/2019 | Rangasamy | G06F 11/3006 |
| 2019/0319977 A1 | 10/2019 | Gottschlich et al. | |
| 2020/0137097 A1 | 4/2020 | Zimmermann et al. | |
| 2020/0310394 A1* | 10/2020 | Wouhaybi | H04L 67/1051 |
| 2020/0310852 A1* | 10/2020 | Featonby | G06F 9/45558 |
| 2021/0081837 A1* | 3/2021 | Polleri | G06N 5/022 |
| 2021/0349749 A1* | 11/2021 | Guha | H04L 43/0882 |
| 2022/0014560 A1* | 1/2022 | Crabtree | H04L 63/1433 |
| 2022/0303352 A1* | 9/2022 | Herzog | G06F 18/22 |

* cited by examiner

APPLICATION ANOMALY DETECTION USING TRAINED INFRASTRUCTURE MACHINE LEARNING MODELS

EARLIEST PRIORITY DATE

This application claims priority from a Provisional patent application filed in the U.S. Patent Application No. 63/113,206, filed on Nov. 13, 2020, and titled "SYSTEM AND METHOD TO CAPTURE FINGERPRINT OF CUSTOMER APPLICATION INFRASTRUCTURE AND IDENTIFY BEHAVIORS SPECIFIC TO APPLICATION FINGERPRINTS".

FIELD OF INVENTION

Embodiments of the present disclosure relate to application infrastructures and more particularly relates to a system and a method for facilitating management of application infrastructure for plurality of users.

BACKGROUND

Application infrastructure consists of multi-layered components required to deliver an application including its functions and services to a customer. However, the application infrastructure is susceptible to multiple application risks, such as infrastructure failure and security breaches. Thus, it is a challenging task to manage the application infrastructure. Conventionally, there are multiple systems available for managing the application infrastructure. However, the conventional systems generate a predictive recommendation model for managing the application infrastructure based on a single infrastructure component's behavior. Thus, the conventional systems fail to manage the application infrastructure efficiently. Further, the conventional systems fail to provide pattern identification in the application infrastructure or customer infrastructure involving multiple related application infrastructure components forming the application. Moreover, the conventional systems are unable to develop any knowledge base models for prediction of anomalies, such as intrusion and faults, in applications by identifying the patterns in the application infrastructure. Furthermore, the conventional systems also fail to develop the knowledge base models for prediction of the anomalies in the applications by correlation-learning from one application's behavior to another application with a similar infrastructure.

Hence, there is an opportunity for an improved system and method for facilitating management of application infrastructure for plurality of users in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for facilitating management of application infrastructure for plurality of users is disclosed. The computing system includes one or more virtualized hardware processors and a memory coupled to the one or more virtualized hardware processors. The memory includes a plurality of modules in the form of programmable instructions executable by the one or more virtualized hardware processors. The plurality of modules include an infrastructure identification module configured to identify a set of infrastructure components corresponding to an application hosted on an application server. The plurality of modules also include a configuration determination module configured to determine configuration information associated with the application based on the identified set of infrastructure components. The plurality of modules include a pattern identification module configured to identify a plurality of patterns of the application based on the determined configuration information of the set of infrastructure components. Further, the plurality of modules include a fingerprint generation module configured to generate one or more application fingerprints corresponding to the application based on the identified plurality of patterns. The plurality of modules also include an anomaly determination module configured to determine one or more anomalies in the application based on the generated one or more application fingerprints by using a trained infrastructure management based Machine Learning (ML) model. Furthermore, the plurality of modules include a recommendation generation module configured to generate one or more recommendations for resolving the determined one or more anomalies in the application based on the generated one or more application fingerprints and prestored information by using the trained infrastructure management based ML model. The plurality of modules further include a data output module configured to output the determined one or more anomalies and the generated one or more recommendations to one or more user devices associated with a plurality of users for managing application infrastructure.

In accordance with another embodiment of the present disclosure, a method for facilitating management of application infrastructure for plurality of users is disclosed. The method includes identifying a set of infrastructure components corresponding to an application hosted on an application server. The method also includes determining configuration information associated with the application based on the identified set of infrastructure components. The method further includes identifying a plurality of patterns of the application based on the determined configuration information of the set of infrastructure components. Further, the method includes generating one or more application fingerprints corresponding to the application based on the identified plurality of patterns. Also, the method includes determining one or more anomalies in the application based on the generated one or more application fingerprints by using a trained infrastructure management based Machine Learning (ML) model. The method includes generating one or more recommendations for resolving the determined one or more anomalies in the application based on the generated one or more application fingerprints and prestored information by using the trained infrastructure management based ML model.

Furthermore, the method includes outputting the determined one or more anomalies and the generated one or more recommendations to one or more user devices associated with a plurality of users for managing application infrastructure.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Although the explanation is limited to a single application, it should be understood by the person skilled in the art that the computing system is applied if there are more than one application.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
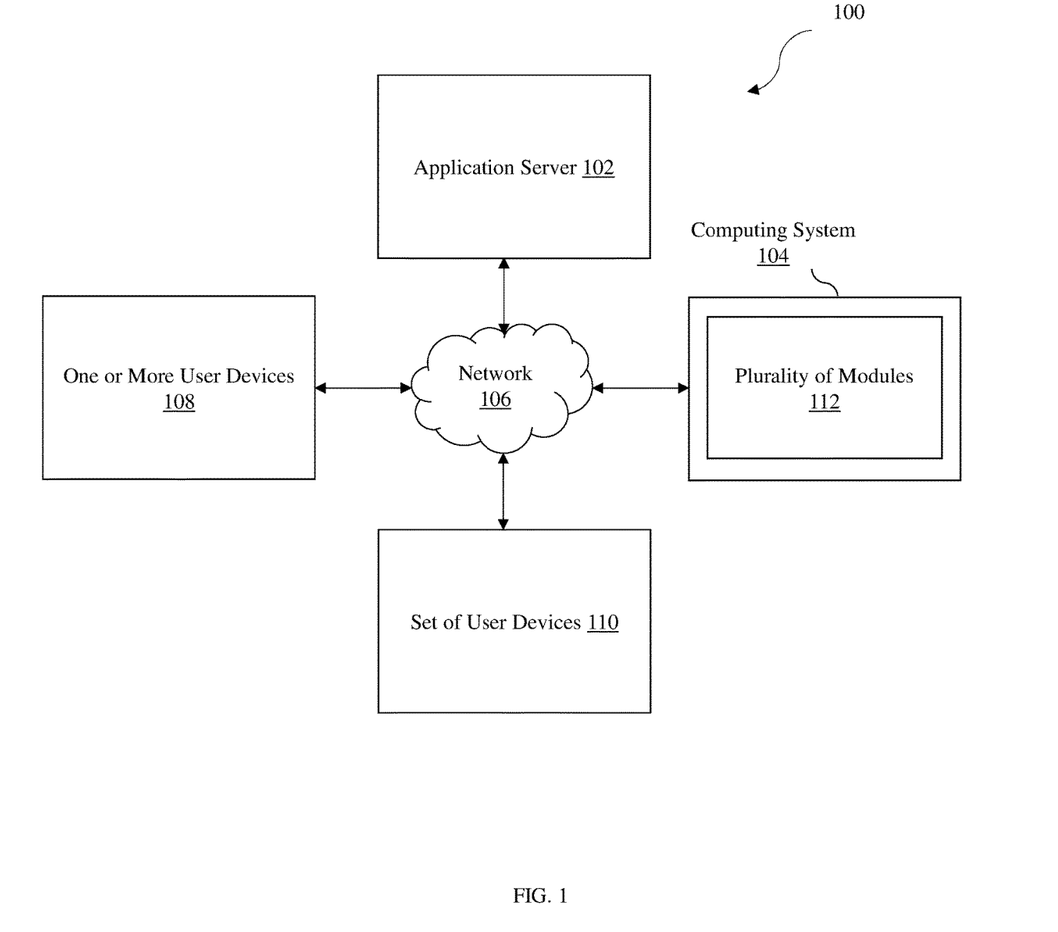
FIG. 1 is a block diagram illustrating an exemplary computing environment for facilitating management of application infrastructure for plurality of users, in accordance with an embodiment of the present disclosure.

FIG. 1 is a block diagram illustrating an exemplary computing environment 100 for facilitating management of application infrastructure for plurality of users, in accordance with an embodiment of the present disclosure. According to FIG. 1, the computing environment 100 includes an application server 102 communicatively coupled to a computing system 104 via a network 106. The application server 102 is configured to host an application. In an exemplary embodiment of the present disclosure, the application server 102 may be a cloud server or a remote server. Further, the network 106 may be internet or any other wireless network. The computing system 104 may be hosted on a central server, such as cloud server or a remote server.

Further, the computing environment 100 includes one or more user devices 108 associated with a plurality of users communicatively coupled to the computing system 104 via the network 106. The one or more user devices 108 may be used by the plurality of users to receive information associated with one or more anomalies in the application determined by the computing system 104. The one or more user devices 108 may also be used by the plurality of users to receive one or more recommendations generated by the computing system 104 for resolving the determined one or more anomalies in the application. Furthermore, the computing environment 100 includes a set of user devices 110 associated with other users communicatively coupled to the computing system 104 via the network 106. In an embodiment of the present disclosure, the set of user devices 110 run one or more applications similar to the application. The set of user devices 110 may be used by the other users to receive the one or more recommendations for resolving the determined one or more anomalies in the one or more applications. In an exemplary embodiment of the present disclosure, the one or more user devices 108 and the set of user devices 110 may include a laptop computer, desktop computer, tablet computer, smartphone, wearable device, smart watch and the like.

Further, the one or more user devices 108 and the set of user devices 110 include a local browser, a mobile application or a combination thereof. Furthermore, the plurality of users and the other users may use a web application via the local browser, the mobile application or a combination thereof to communicate with the computing system 104. In an embodiment of the present disclosure, the computing system 104 includes a plurality of modules 112. Details on the plurality of modules 112 have been elaborated in subsequent paragraphs of the present description with reference to FIG. 2.

In an embodiment of the present disclosure, the computing system 104 is configured to identify a set of infrastructure components corresponding to the application hosted on the application server 102. The computing system 104 determines configuration information associated with the application based on the identified set of infrastructure components. Further, the computing system 104 identifies a plurality of patterns of the application based on the determined configuration information of the set of infrastructure components. The computing system 104 generates one or more application fingerprints corresponding to the application based on the identified plurality of patterns. Furthermore, the computing system 104 determines one or more anomalies in the application based on the generated one or more application fingerprints by using a trained infrastructure management based Machine Learning (ML) model. The computing system 104 generates the one or more recommendations for resolving the determined one or more anomalies in the application based on the generated one or more application fingerprints and prestored information by using the trained infrastructure management based ML model. The computing system 104 outputs the determined one or more anomalies and the generated one or more recommendations to the one or more user devices 108 associated with the plurality of users for managing the application infrastructure.

Figure 2:
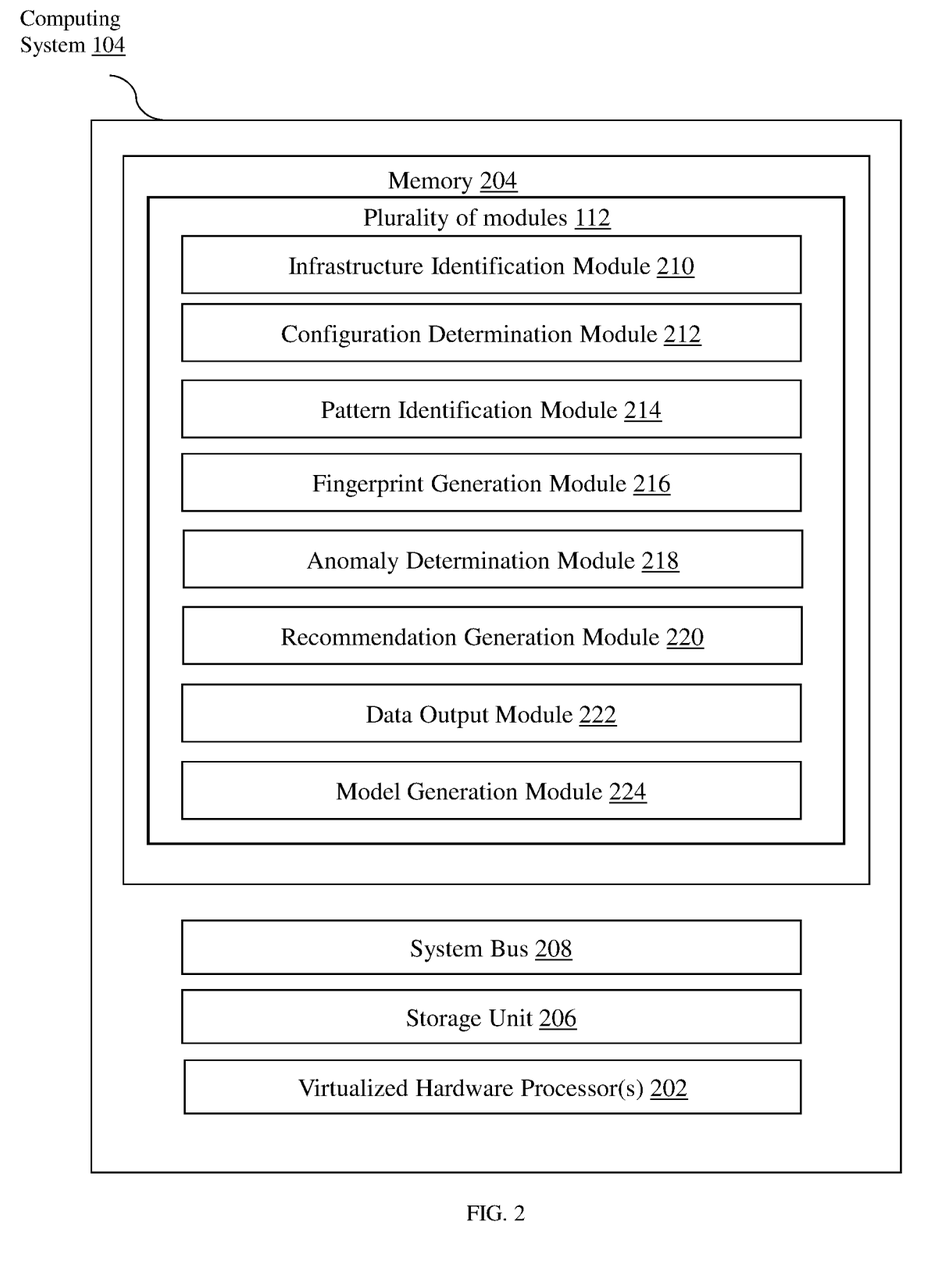
FIG. 2 is a block diagram illustrating an exemplary computing system, such as those shown in FIG. 1, for facilitating management of the application infrastructure for the plurality of users, in accordance with an embodiment of the present disclosure.

FIG. 2 is a block diagram illustrating an exemplary computing system 104 such as those shown in FIG. 1, for facilitating management of the application infrastructure for the plurality of users. The computing system 104 comprises one or more virtualized hardware processors 202, a memory 204 and a storage unit 206. The one or more virtualized hardware processors 202, the memory 204 and the storage unit 206 are communicatively coupled through a system bus 208 or any similar mechanism. The memory 204 comprises the plurality of modules 112 in the form of programmable instructions executable by the one or more virtualized hardware processors 202. Further, the plurality of modules 112 includes an infrastructure identification module 210, a configuration determination module 212, a pattern identification module 214, a fingerprint generation module 216, an anomaly determination module 218, a recommendation generation module 220, a data output module 222 and a model generation module 224.

The one or more virtualized hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more virtualized hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more virtualized hardware processors 202, such as being a computer-readable storage medium. The one or more virtualized hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 112 stored in the form of machine-readable instructions on any of the above-mentioned storage media and may be in communication with and executed by the one or more virtualized hardware processors 202.

The storage unit 206 may be a cloud storage. The storage unit 206 may store the configuration information, the plurality of patterns and the one or more application fingerprints. The storage unit 206 may also store behavioral information associated with the application, prestored infrastructure information, one or more feedbacks and the prestored information.

The infrastructure identification module 210 is configured to identify the set of infrastructure components corresponding to the application hosted on the application server 102. In an exemplary embodiment of the present disclosure, the set of infrastructure components includes networking layers, virtualization layers, operating system/container/server-less services layers, custom solution layers which create the application and the like.

The configuration determination module 212 is configured to determine the configuration information associated with the application based on the identified set of infrastructure components. In an embodiment of the present disclosure, the configuration determination module 212 monitors workload associated with the plurality of users on the identified set of infrastructure components to determine the configuration information. In an exemplary embodiment of the present disclosure, the configuration information includes a blueprint configuration, custom application configurations, infrastructure as code data, one or more services used by the plurality of users, one or more activities performed by the plurality of users during workload and the like.

The pattern identification module 214 is configured to identify the plurality of patterns of the application based on the determined configuration information of the set of infrastructure components. In an exemplary embodiment of the present disclosure, the pattern identification module 214 uses dimensionality reduction technique to identify the plurality of patterns. In identifying the plurality of patterns of the application based on the determined configuration information of the set of infrastructure components, the pattern identification module 214 classifies the set of infrastructure components based on prestored infrastructure information. Further, the pattern identification module 214 identifies the plurality of patterns of the application based on the determined configuration information and the classified set of infrastructure components. In an exemplary embodiment of the present disclosure, the plurality of patterns include unique machine readable meta data structure representing the set of infrastructure components, inter-dependencies between the set of infrastructure components, one or more layers, cloud services, uniqueness of each application as captured as an expressible structure and the like. In an exemplary embodiment of the present disclosure, the one or more layers include networking layer, visualization layer and the like.

In an embodiment of the present disclosure, when the application is server-based application that auto-scale, the plurality of patterns are identified based on configuration of servers and application of auto-scale patterns. In an exemplary embodiment of the present disclosure, the configuration of servers include size, computing power of the server and the like. Further, when the application is content distribution application, the plurality of patterns are identified based on use of Content Delivery Network (CDN), geo-location of servers, use of data streaming services and the like. When the application is continuously deployed application, the plurality of patterns are identified based on deployment strategy, such as blue-green, canary deployment and the like.

The fingerprint generation module 216 is configured to generate the one or more application fingerprints corresponding to the application based on the identified plurality of patterns. In generating the one or more application fingerprints corresponding to the application based on the identified plurality of patterns, the fingerprint generation module 216 abstracts the identified plurality of patterns. In an embodiment of the present disclosure, the identified plurality of patterns are abstracted away as simple and comparable units. Further, the fingerprint generation module 216 generates the one or more application fingerprints based on the abstracted plurality of patterns. In an embodiment of the present disclosure, the identified plurality of patterns are abstracted by extracting core information from the configuration information in a consistent manner and creating a hash, digest or reduction of the extracted core information.

The anomaly determination module 218 is configured to determine the one or more anomalies in the application based on the generated one or more application fingerprints by using a trained infrastructure management based Machine Learning (ML) model. In an exemplary embodiment of the present disclosure, the trained infrastructure management based ML model is a combination of isolation forest and K-Nearest Neighbor (KNN). In an embodiment of the present disclosure, the one or more anomalies are deviation from expected behavior of the application after an event, such as deployment, patching, scaling and the like. In an exemplary embodiment of the present disclosure, the one or more anomalies include abnormal application resource utilization after the event, unexpected failures or outages and the like. In determining the one or more anomalies in the application based on the generated one or more application fingerprints by using the trained infrastructure management based ML model, the anomaly determination module 218 captures the behavioral information associated with the application. In an embodiment of the present disclosure, the behavior information is captured anonymously. In an exemplary embodiment of the present disclosure, the behavioral information includes response to patches, change deployment, performance under load, response latency, correlation of the response latency with server CPU load and the like. Further, the anomaly determination module 218 detects whether there is a change in the behavioral information associated with the application by monitoring the configuration information. In an embodiment of the present disclosure, the anomaly detection module continuously monitors the configuration information to determine whether there is a change in the behavioral information. The anomaly determination module 218 determines the one or more anomalies in the application based on the detected change and the generated one or more application fingerprints by using the trained infrastructure management based ML model. In an embodiment of the present disclosure, the determined one or more anomalies and the generated one or more application fingerprints are provided to the trained infrastructure management based ML model as behavior based learning data for improving accuracy of the trained infrastructure management based ML model.

The recommendation generation module 220 is configured to generate the one or more recommendations for resolving the determined one or more anomalies in the application based on the generated one or more application fingerprints and the prestored information by using the trained infrastructure management based ML model. In generating the one or more recommendations for resolving the detected one or more anomalies in the application based on the generated one or more application fingerprints and the prestored information by using the trained infrastructure management based ML model, the recommendation generation module 220 collects one or more user feedbacks corresponding to the determined one or more anomalies from the one or more user devices 108. In an embodiment of the present disclosure, the one or more feedbacks may include remedial steps taken by the plurality of users to resolve the one or more anomalies and effect of remedial steps. In an embodiment of the present disclosure, the one or more feedbacks are collected anonymously. Further, the recommendation generation module 220 generates the one or more recommendations for resolving the detected one or more anomalies in the application based on the generated one or more application fingerprints, the prestored information and the collected one or more user feedbacks by using the trained infrastructure management based ML model. In an embodiment of the present disclosure, the one or more feedbacks and the one or more recommendations may be provided to the trained infrastructure management based ML model as reaction based learning data for improving accuracy of the trained infrastructure management based ML model.

In an embodiment of the present disclosure, when the one or more anomalies are determined, the anomaly determination module 218 obtains anomaly information, such as information associated with configuration rule, information associated with threat monitoring service and the like. Further, the recommendation generation module 220 generates the one or more recommendations for resolving the determined one or more anomalies in the application based on the generated one or more application fingerprints, the prestored information and the obtained anomaly information by using the trained infrastructure management based ML model.

The data output module 222 is configured to output the determined one or more anomalies and the generated one or more recommendations to the one or more user devices 108 associated with the plurality of users for managing application infrastructure. The data output module 222 may output the generated one or more recommendations to the one or more user devices 108 via electronic email, a short message service and the like. In an embodiment of the present disclosure, the data output module 222 detects the set of user devices 110 connected to the network 106 associated with the one or more user devices 108 and running the one or more applications similar to the application. In an embodiment of the present disclosure, the data output module 222 determines whether the one or more anomalies are present in the one or more applications. Further, the data output module 222 broadcasts the generated one or more recommendations to each of the detected set of user devices 110 upon determining that the one or more anomalies are present in the one or more applications. In an embodiment of the present disclosure, the data output module 222 also broadcasts the determined one or more anomalies to each of the detected set of user devices 110. In an exemplary embodiment of the present disclosure, the one or more user devices 108 and the set of user devices 110 may include a laptop computer, desktop computer, tablet computer, smartphone, wearable device, smart watch and the like.

In an embodiment of the present disclosure, before using the trained infrastructure management based ML model, the trained infrastructure management based ML model is required to be trained. The model generation module 224 is configured to generate the trained infrastructure management based ML model. In generating the trained infrastructure management based ML model, the model generation module 224 captures the behavioral information associated with the application. Further, the model generation module 224 classifies the captured behavioral information into one or more reactions, one or more observations or a combination thereof based on one or more events. In an exemplary embodiment of the present disclosure, the one or more events include patch, task execution, scaling pattern and user initiated, environmental, observed lifecycle changes of the set of infrastructure components or any combination thereof. The model generation module 224 correlates the one or more application fingerprints with the classified behavioral information. Furthermore, the model generation module 224 generates the trained infrastructure management based ML model based on result of correlation. In an embodiment of the present disclosure, since application fingerprints of similar application infrastructures associated with the plurality of users are comparable, learning of the trained infrastructure management based ML model may be easily transferred from one user to another user. Thus, the computing system 104 accurately manages the application infrastructures for the plurality of users.

In an exemplary scenario, the computing system 104 identifies the set of infrastructure components corresponding to the application hosted on the application server 102, such as networking layers, virtualization layers, operating system/container/server-less services layers, custom solution layers which create the application and the like. Further, the computing system 104 determines the configuration information associated with the application by monitoring user workload on the identified set of infrastructure components. For example, a Linux m4 extra-large, RDS with a read replica and the like. The computing system 104 identifies the plurality of patterns of the application based on the determined configuration information of the set of infrastructure components. Furthermore, the computing system 104 generate the one or more application fingerprints corresponding to the application based on the identified plurality of patterns, such as the application uses service 1 and service 2.

The computing system 104 determines the one or more anomalies in the application based on the generated one or more application fingerprints by using the trained infrastructure management based ML model. When the computing system 104 determines the one or more anomalies, the computing system 104 obtains anomaly information, such as is configuration rule turned on, is threat monitoring service turned on and the like. The computing system 104 generates the one or more recommendations for resolving the determined one or more anomalies in the application based on the generated one or more application fingerprints, the prestored information and the obtained anomaly information by using the trained infrastructure management based ML model. Further, the computing system 104 outputs the determined one or more anomalies and the generated one or more recommendations to the one or more user devices 108 associated with the plurality of users for managing application infrastructure. The computing system 104 also detects the set of user devices 110 connected to the network 106 associated with the one or more user devices 108 and running the one or more applications similar to the application. In an embodiment of the present disclosure, the data computing system 104 determines whether the one or more anomalies are present in the one or more applications. Furthermore, the computing system 104 broadcasts the generated one or more recommendations to each of the detected set of user devices 110 upon determining that the one or more anomalies are present in the one or more applications. The computing system 104 also differentiates if the one or more applications that are running in accounts with threat monitoring service turned on are experiencing issues. When the one or more applications are not experiencing issues, the computing system 104 generates different recommendations for the one or more applications. In an exemplary embodiment, the computing system 104 may detect and generate the one or more recommendations corresponding to anomalies including virus spreading, misconfiguration hitting similar users, social networking site experiencing issues in a specific region and the like. For example, the computing system 104 inform all users using the social networking site experiencing issues.

Figure 3:
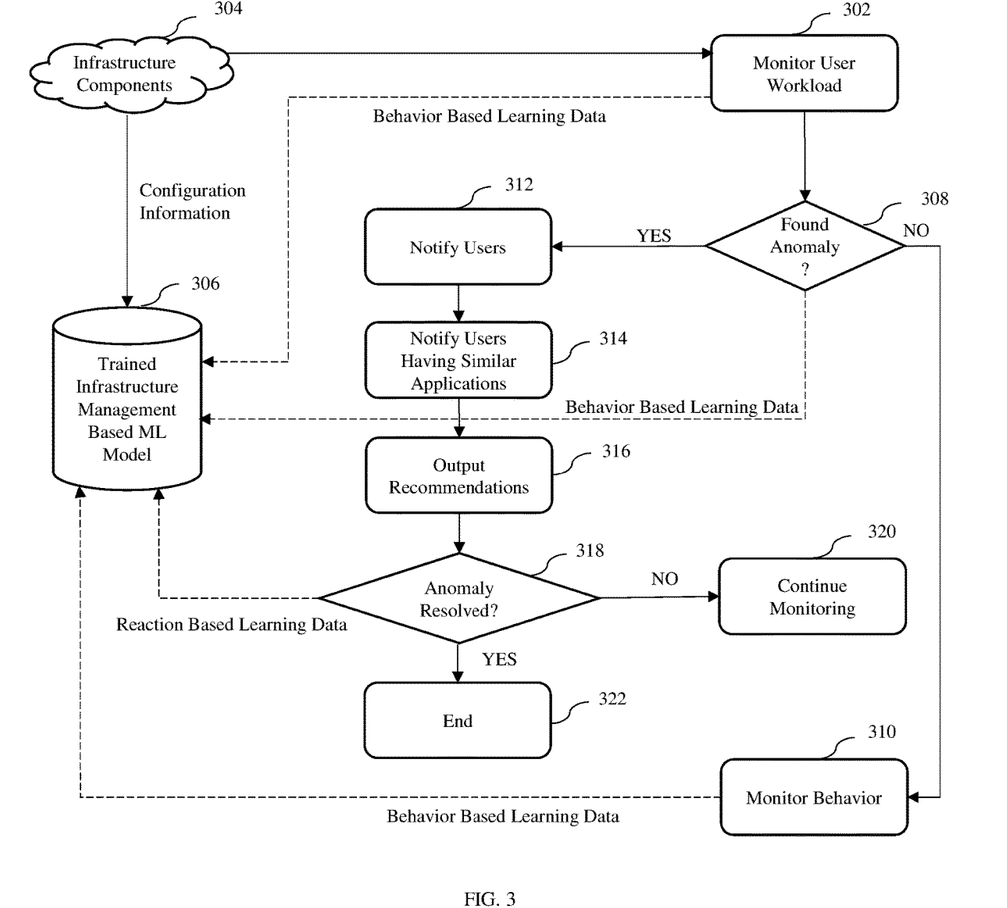
FIG. 3 is a schematic representation illustrating operation of the exemplary computing system to facilitate management of the application infrastructure for the plurality of users, in accordance with an embodiment of the present disclosure.

FIG. 3 is a schematic representation illustrating operation of the exemplary computing system 104 to facilitate management of the application infrastructure for the plurality of users, in accordance with an embodiment of the present disclosure. At step 302, the computing system 104 monitors the workload associated with the user on the set of infrastructure components 304 to determine the configuration information associated with the application. The determined configuration information is provided to the trained infrastructure management based ML model 306 to improve accuracy of the trained infrastructure management based ML model 306. Further, the computing system 104 identifies the plurality of patterns of the application based on the determined configuration information of the set of infrastructure components 304. The computing system 104 further generates the one or more application fingerprints corresponding to the application based on the identified plurality of patterns. The generated one or more application fingerprints are provided to the trained infrastructure management based ML model 306 as behavior based learning data for improving accuracy of the trained infrastructure management based ML model 306. At step 308, the computing system 104 determines if there are one or more anomalies in the application. When the one or more anomalies are not determined in the application, the computing system 104 monitors the behavioural information associated with the application to detect change in the behavioural information, at step 310. The behavioural information associated with the application is provided to the trained infrastructure management based ML model 306 as behavior based learning data for improving accuracy of the trained infrastructure management based ML model 306.

When the computing system 104 determines the one or more anomalies in the application, the computing system 104 outputs the determined one or more anomalies to the one or more user devices 108 associated with the plurality of users at step 312. In an embodiment of the present disclosure, the one or more anomalies are determined based on the change in the behavioral configuration and the generated one or more application fingerprints by using the trained infrastructure management based ML model 306. Also, the determined one or more anomalies are provided to the trained infrastructure management based ML model 306 as behavior based learning data for improving accuracy of the trained infrastructure management based ML model. Further, at step 314, the computing system 104 detects the set of user devices 110 associated with the other users connected to the network 106 and running the one or more applications similar to the application and broadcasts the generated one or more recommendations to each of the detected set of user devices 110. The computing system 104 also outputs the one or more recommendations to the one or more user devices 108 and the set of user devices 110 to resolve the one or more anomalies, at step 316. At step 318, it is determined if the one or more anomalies are resolved. When the one or more anomalies are not resolved, the computing system 104 continues to monitor the workload associated with the user at step 320. Furthermore, when the one or more anomalies are resolved, the computing system 104 operation ends at step 322. The one or more one or more recommendations along with the effect of the one or more recommendations on the application may be provided to the trained infrastructure management based ML model 306 as reaction based learning data for improving accuracy of the trained infrastructure management based ML model 306.

Figure 4:
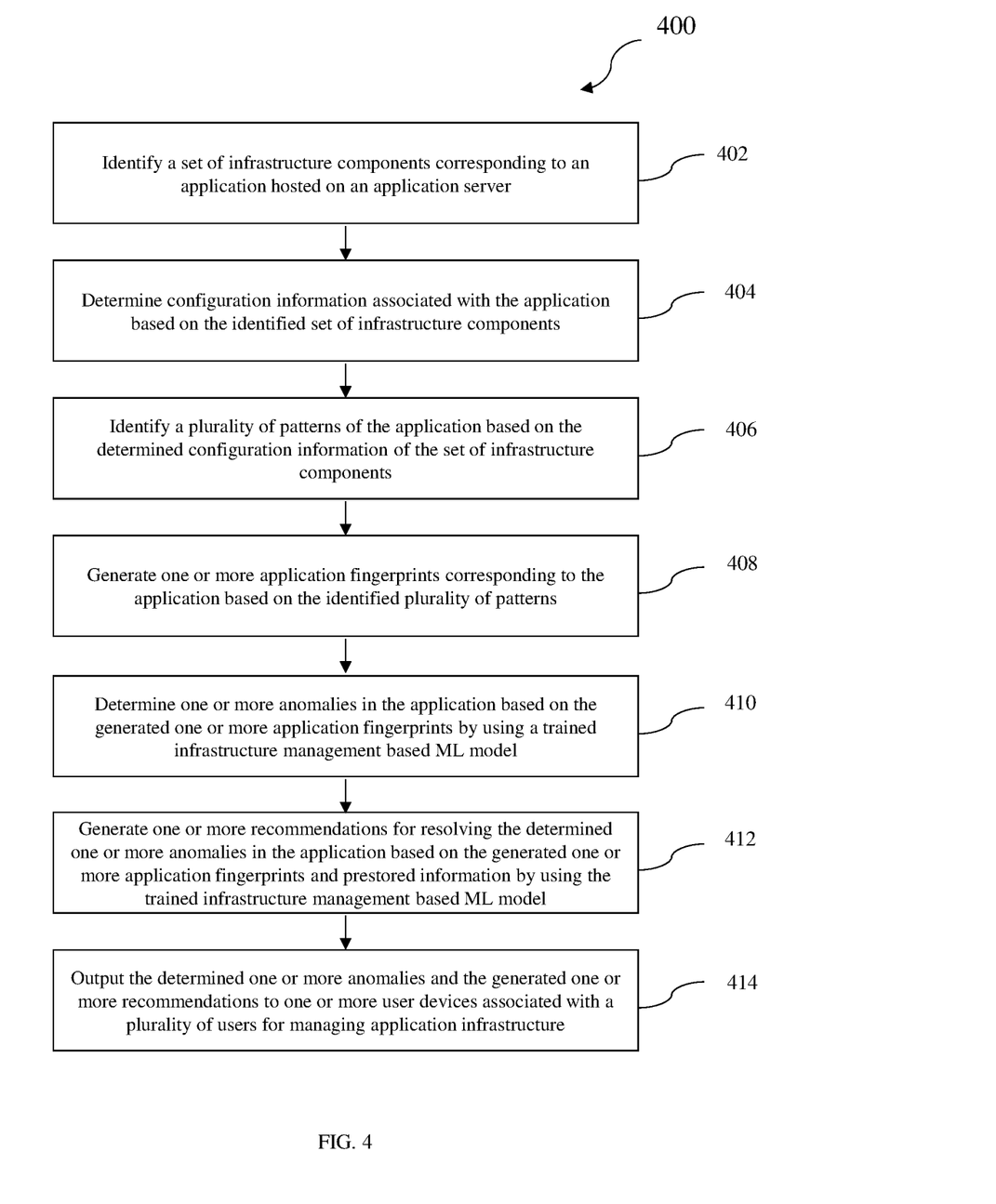
FIG. 4 is a process flow diagram illustrating an exemplary method for facilitating management of the application infrastructure for the plurality of users, in accordance with an embodiment of the present disclosure.

FIG. 4 is a process flow diagram illustrating an exemplary method for facilitating management of application infrastructure for plurality of users, in accordance with an embodiment of the present disclosure. At step 402, a set of infrastructure components is identified corresponding to an application hosted on an application server 102. In an exemplary embodiment of the present disclosure, the set of infrastructure components includes networking layers, virtualization layers, operating system/container/server-less services layers, custom solution layers which create the application and the like.

At step 404, configuration information associated with the application is determined based on the identified set of infrastructure components. In an embodiment of the present disclosure, workload associated with the plurality of users is monitored on the identified set of infrastructure components to determine the configuration information. In an exemplary embodiment of the present disclosure, the configuration information includes a blueprint configuration, custom application configurations, infrastructure as code data, one or more services used by the plurality of users, one or more activities performed by the plurality of users during workload and the like At step 406, a plurality of patterns of the application is identified based on the determined configuration information of the set of infrastructure components. In an exemplary embodiment of the present disclosure, dimensionality reduction technique is used to identify the plurality of patterns. In identifying the plurality of patterns of the application based on the determined configuration information of the set of infrastructure components, the method 400 includes classifying the set of infrastructure components based on pre-stored infrastructure information. Further, the method 400 includes identifying the plurality of patterns of the application based on the determined configuration information and the classified set of infrastructure components. In an exemplary embodiment of the present disclosure, the plurality of patterns include unique machine readable meta data structure representing the set of infrastructure components, interdependencies between the set of infrastructure components, one or more layers, cloud services, uniqueness of each application as captured as an expressible structure and the like. In an exemplary embodiment of the present disclosure, the one or more layers include networking layer, visualization layer and the like.

In an embodiment of the present disclosure, when the application is server-based application that auto-scale, the plurality of patterns are identified based on configuration of servers and application of auto-scale patterns. In an exemplary embodiment of the present disclosure, the configuration of servers include size, computing power of the server and the like. Further, when the application is content distribution application, the plurality of patterns are identified based on use of Content Delivery Network (CDN), geo-location of servers, use of data streaming services and the like. When the application is continuously deployed application, the plurality of patterns are identified based on deployment strategy, such as blue-green, canary deployment and the like.

At step 408, one or more application fingerprints corresponding to the application are generated based on the identified plurality of patterns. In generating the one or more application fingerprints corresponding to the application based on the identified plurality of patterns, the method 400 includes abstracting the identified plurality of patterns. In an embodiment of the present disclosure, the identified plurality of patterns are abstracted away as simple and comparable units. Further, the method 400 includes generating the one or more application fingerprints based on the abstracted plurality of patterns. In an embodiment of the present disclosure, the identified plurality of patterns are abstracted by extracting core information from the configuration information in a consistent manner and creating a hash, digest or reduction of the extracted core information.

At step 410, one or more anomalies in the application are determined based on the generated one or more application fingerprints by using a trained infrastructure management based Machine Learning (ML) model. In an exemplary embodiment of the present disclosure, the trained infrastructure management based ML model is a combination of isolation forest and K-Nearest Neighbor (KNN). In an embodiment of the present disclosure, the one or more anomalies are deviation from expected behavior of the application after an event, such as deployment, patching, scaling and the like. In an exemplary embodiment of the present disclosure, the one or more anomalies include abnormal application resource utilization after the event, unexpected failures or outages and the like. In determining the one or more anomalies in the application based on the generated one or more application fingerprints by using the trained infrastructure management based ML model, the method 400 includes capturing the behavioral information associated with the application. In an embodiment of the present disclosure, the behavior information is captured anonymously. In an exemplary embodiment of the present disclosure, the behavioral information includes response to patches, change deployment, performance under load, response latency, correlation of the response latency with server CPU load and the like. Further, the method 400 includes detecting whether there is a change in the behavioral information associated with the application by monitoring the configuration information. In an embodiment of the present disclosure, the configuration information is continuously monitored to determine whether there is a change in the behavioral information. The method 400 includes determining the one or more anomalies in the application based on the detected change and the generated one or more application fingerprints by using the trained infrastructure management based ML model. In an embodiment of the present disclosure, the determined one or more anomalies and the generated one or more application fingerprints are provided to the trained infrastructure management based ML model as behavior based learning data for improving accuracy of the trained infrastructure management based ML model.

At step 412, one or more recommendations are generated for resolving the determined one or more anomalies in the application based on the generated one or more application fingerprints and prestored information by using the trained infrastructure management based ML model. In generating the one or more recommendations for resolving the detected one or more anomalies in the application based on the generated one or more application fingerprints and the prestored information by using the trained infrastructure management based ML model, the method 400 includes collecting one or more user feedbacks corresponding to the determined one or more anomalies from the one or more user devices 108. In an embodiment of the present disclosure, the one or more feedbacks may include remedial steps taken by the plurality of users to resolve the one or more anomalies and effect of remedial steps. In an embodiment of the present disclosure, the one or more feedbacks are collected anonymously. Further, the method 400 includes generating the one or more recommendations for resolving the detected one or more anomalies in the application based on the generated one or more application fingerprints, the prestored information and the collected one or more user feedbacks by using the trained infrastructure management based ML model. In an embodiment of the present disclosure, the one or more feedbacks and the one or more recommendations may be provided to the trained infrastructure management based ML model as reaction based learning data for improving accuracy of the trained infrastructure management based ML model.

In an embodiment of the present disclosure, when the one or more anomalies are determined, anomaly information is obtained, such as information associated with configuration rule, information associated with threat monitoring service and the like. Further, the one or more recommendations are generated for resolving the determined one or more anomalies in the application based on the generated one or more application fingerprints, the prestored information and the obtained anomaly information by using the trained infrastructure management based ML model.

At step 414, the determined one or more anomalies and the generated one or more recommendations are outputted to one or more user devices 108 associated with a plurality of users for managing application infrastructure. The generated one or more recommendations may be outputted to the one or more user devices 108 via electronic email, a short message service and the like. In an embodiment of the present disclosure, the method 400 includes detecting the set of user devices 110 connected to the network 106 associated with the one or more user devices 108 and running the one or more applications similar to the application. In an embodiment of the present disclosure, the method 400 includes determining whether the one or more anomalies are present in the one or more applications. Further, the method 400 includes broadcasting the generated one or more recommendations to each of the detected set of user devices 110 upon determining that the one or more anomalies are present in the one or more applications. In an embodiment of the present disclosure, method 400 also includes broadcasting the determined one or more anomalies to each of the detected set of user devices 110. In an exemplary embodiment of the present disclosure, the one or more user devices 108 and the set of user devices 110 may include a laptop computer, desktop computer, tablet computer, smartphone, wearable device, smart watch and the like.

In an embodiment of the present disclosure, before using the trained infrastructure management based ML model, the trained infrastructure management based ML model is required to be trained. In generating the trained infrastructure management based ML model, the method 400 includes capturing the behavioral information associated with the application. Further, the method 400 includes classifying the captured behavioral information into one or more reactions, one or more observations or a combination thereof based on one or more events. In an exemplary embodiment of the present disclosure, the one or more events include patch, task execution, scaling pattern and user initiated, environmental, observed lifecycle changes of the set of infrastructure components or any combination thereof. The method 400 includes correlating the one or more application fingerprints with the classified behavioral information. Furthermore, the method 400 includes generating the trained infrastructure management based ML model based on result of correlation. In an embodiment of the present disclosure, since application fingerprints of similar application infrastructures associated with the plurality of users are comparable, learning of the trained infrastructure management based ML model may be easily transferred from one user to another user.

The method 400 may be implemented in any suitable hardware, software, firmware, or combination thereof.

Thus, various embodiments of the present computing system 104 provide a solution to facilitate management of the application infrastructure for the plurality of users. The computing system 104 determines the one or more anomalies in the application to avoid multiple application risks, such as infrastructure failure and security breaches. Further, the computing system 104 generates the one or more recommendations for resolving the determined one or more anomalies in the application. The computing system 104 also broadcasts the one or more recommendations to the set of user devices 110 connected to the network 106 and running one or more applications similar to the application. Furthermore, the computing system 104 considers the one or more user feedbacks while generating the one or more recommendations. Thus, the computing system 104 generates and accurate and personalized one or more recommendations to resolve the one or more anomalies.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A computing system for facilitating management of application infrastructure for plurality of users, the computing system comprising:
   one or more virtualized hardware processors; and
   a memory coupled to the one or more virtualized hardware processors, wherein the memory comprises a plurality of modules in the form of programmable instructions executable by the one or more virtualized hardware processors, wherein the plurality of modules comprises:
      an infrastructure identification module configured to identify a set of infrastructure components corresponding to an application hosted on an application server;
      a configuration determination module configured to determine configuration information associated with the application based on the identified set of infrastructure components;
      a pattern identification module configured to identify a plurality of patterns of the application using a dimensionality reduction technique, based on the determined configuration information of the set of infrastructure components;
      a fingerprint generation module configured to generate one or more application fingerprints corresponding to the application based on the identified plurality of patterns;

a model generation module configured to generate a trained infrastructure management based Machine Learning (ML) model, wherein in generating the trained infrastructure management based ML model, the model generation module is configured to:
   capture behavioral information associated with the application;
   classify the captured behavioral information into at least one of one or more reactions and one or more observations based on one or more events, wherein the one or more events comprise: patch, task execution, scaling pattern and at least one of: user initiated, environmental and observed lifecycle changes of the set of infrastructure components;
   correlate the one or more application fingerprints with the classified behavioral information; and
   generate the trained infrastructure management based ML model based on result of correlation;
an anomaly determination module configured to determine one or more anomalies in the application based on the generated one or more application fingerprints by using the trained infrastructure management based ML model;
a recommendation generation module configured to generate one or more recommendations for resolving the determined one or more anomalies in the application based on the generated one or more application fingerprints and prestored information by using the trained infrastructure management based ML model; and
a data output module configured to output the determined one or more anomalies and the generated one or more recommendations to one or more user devices associated with a plurality of users for managing application infrastructure.

2. The computing system of claim 1, wherein the configuration information comprises: a blueprint configuration, custom application configurations, infrastructure as code data, one or more services used by the plurality of users and one or more activities performed by the plurality of users during workload.

3. The computing system of claim 1, wherein the behavioral information comprises: response to patches, change deployment, performance under load, response latency and correlation of the response latency with server CPU load.

4. The computing system of claim 1, wherein the plurality of patterns comprise: unique machine readable meta data structure representing the set of infrastructure components, inter-dependencies between the set of infrastructure components, one or more layers, cloud services and uniqueness of each application as captured as an expressible structure.

5. The computing system of claim 1, wherein in generating the one or more application fingerprints corresponding to the application based on the identified plurality of patterns, the fingerprint generation module is configured to:
   abstract the identified plurality of patterns; and
   generate the one or more application fingerprints based on the abstracted plurality of patterns.

6. The computing system of claim 1, wherein in identifying the plurality of patterns of the application based on the determined configuration information of the set of infrastructure components, the pattern identification module is configured to:
   classify the set of infrastructure components based on prestored infrastructure information; and
   identify the plurality of patterns of the application based on the determined configuration information and the classified set of infrastructure components.

7. The computing system of claim 1, wherein in determining the one or more anomalies in the application based on the generated one or more application fingerprints by using the trained infrastructure management based ML model, the anomaly determination module is configured to:
   capture the behavioral information associated with the application;
   detect whether there is a change in the behavioral information associated with the application by monitoring the configuration information; and
   determine the one or more anomalies in the application based on the detected change and the generated one or more application fingerprints by using the trained infrastructure management based ML model.

8. The computing system of claim 1, wherein the data output module is further configured to:
   detect a set of user devices connected to a network associated with the one or more user devices and running one or more applications similar to the application; and
   broadcast the generated one or more recommendations to each of the detected set of user devices.

9. The computing system of claim 1, wherein in generating the one or more recommendations for resolving the detected one or more anomalies in the application based on the generated one or more application fingerprints and the prestored information by using the trained infrastructure management based ML model, the recommendation generation module is further configured to:
   collect one or more user feedbacks corresponding to the determined one or more anomalies from the one or more user devices; and
   generate the one or more recommendations for resolving the detected one or more anomalies in the application based on the generated one or more application fingerprints, the prestored information and the collected one or more user feedbacks by using the trained infrastructure management based ML model.

10. A method for facilitating management of application infrastructure for plurality of users, the method comprising:
   identifying, by one or more virtualized hardware processors, a set of infrastructure components corresponding to an application hosted on an application server;
   determining, by the one or more virtualized hardware processors, configuration information associated with the application based on the identified set of infrastructure components;
   identifying, by the one or more virtualized hardware processors, a plurality of patterns of the application using a dimensionality reduction technique, based on the determined configuration information of the set of infrastructure components;
   generating, by the one or more virtualized hardware processors, one or more application fingerprints corresponding to the application based on the identified plurality of patterns;
   generating, by the one or more virtualized hardware processors, a trained infrastructure management based Machine Learning (ML) model, wherein generating the trained infrastructure management based ML model comprises:
      capturing behavioral information associated with the application;

classifying the captured behavioral information into at least one of one or more reactions and one or more observations based on one or more events, wherein the one or more events comprise: patch, task execution, scaling pattern and at least one of: user initiated, environmental and observed lifecycle changes of the set of infrastructure components;

correlating the one or more application fingerprints with the classified behavioral information; and generating the trained infrastructure management based ML model based on result of correlation;

determining, by the one or more virtualized hardware processors, one or more anomalies in the application based on the generated one or more application fingerprints by using the trained infrastructure management based ML model;

generating, by the one or more virtualized hardware processors, one or more recommendations for resolving the determined one or more anomalies in the application based on the generated one or more application fingerprints and prestored information by using the trained infrastructure management based ML model; and outputting, by the one or more virtualized hardware processors, the determined one or more anomalies and the generated one or more recommendations to one or more user devices associated with a plurality of users for managing application infrastructure.

11. The method of claim 10, wherein the configuration information comprises: a blueprint configuration, custom application configurations, infrastructure as code data, one or more services used by the plurality of users and one or more activities performed by the plurality of users during workload.

12. The method of claim 10, wherein the behavioral information comprises: response to patches, change deployment, performance under load, response latency and correlation of the response latency with server CPU load.

13. The method of claim 10, wherein the plurality of patterns comprise: unique machine readable meta data structure representing the set of infrastructure components, interdependencies between the set of infrastructure components, one or more layers, cloud services and uniqueness of each application as captured as an expressible structure.

14. The method of claim 10, wherein generating the one or more application fingerprints corresponding to the application based on the identified plurality of patterns comprises:

abstracting the identified plurality of patterns; and generating the one or more application fingerprints based on the abstracted plurality of patterns.

15. The method of claim 10, wherein identifying the plurality of patterns of the application based on the determined configuration information of the set of infrastructure components comprises:

classifying the set of infrastructure components based on prestored infrastructure information; and identifying the plurality of patterns of the application based on the determined configuration information and the classified set of infrastructure components.

16. The method of claim 10, wherein determining the one or more anomalies in the application based on the generated one or more application fingerprints by using the trained infrastructure management based ML model comprises:

capturing the behavioral information associated with the application;

detecting whether there is a change in the behavioral information associated with the application by monitoring the configuration information; and determining the one or more anomalies in the application based on the detected change and the generated one or more application fingerprints by using the trained infrastructure management based ML model.

17. The method of claim 10, further comprises:

detecting a set of user devices connected to a network associated with the one or more user devices and running one or more applications similar to the application; and broadcasting the generated one or more recommendations to each of the detected set of user devices.

18. The method of claim 10, wherein generating the one or more recommendations for resolving the detected one or more anomalies in the application based on the generated one or more application fingerprints and the prestored information by using the trained infrastructure management based ML model comprises:

collecting one or more user feedbacks corresponding to the determined one or more anomalies from the one or more user devices; and generating the one or more recommendations for resolving the detected one or more anomalies in the application based on the generated one or more application fingerprints, the prestored information and the collected one or more user feedbacks by using the trained infrastructure management based ML model.

* * * * *